United States Patent
Northup, Jr. et al.

(10) Patent No.: US 6,499,979 B2
(45) Date of Patent: Dec. 31, 2002

(54) PRILLING HEAD ASSEMBLY FOR PELLETIZER VESSEL

(75) Inventors: Aldrich Holt Northup, Jr., Katy, TX (US); Cameron O. Olson, Houston, TX (US); Robert A. Robinson, Missouri City, TX (US); Murugesan Subramanian, Houston, TX (US); Chris W. Taylor, Houston, TX (US); Jon C. Moretta, Northbrook, IL (US)

(73) Assignee: Kellogg Brown & Root, Inc., Houston, TX (US)

(*) Notice: Subject to any disclaimer, the term of this patent is extended or adjusted under 35 U.S.C. 154(b) by 63 days.

(21) Appl. No.: 09/815,372

(22) Filed: Mar. 22, 2001

(65) Prior Publication Data

US 2002/0182280 A1 Dec. 5, 2002

Related U.S. Application Data

(63) Continuation-in-part of application No. 09/447,408, filed on Nov. 23, 1999, now Pat. No. 6,331,245.

(51) Int. Cl.$^7$ .................................................. B29B 9/10
(52) U.S. Cl. .............................. 425/6; 425/8; 425/464; 196/112; 196/140
(58) Field of Search ................................. 196/112, 140, 196/127; 425/6, 8, 464; 264/8

(56) References Cited

U.S. PATENT DOCUMENTS

| | | | |
|---|---|---|---|
| 2,616,837 A | 11/1952 | Roediger | 208/6 |
| 2,627,498 A | 2/1953 | Fink et al. | 208/4 |
| 2,861,939 A | 11/1958 | Biribauer et al. | 208/6 |
| 2,889,296 A | 6/1959 | Morris et al. | 523/307 |
| 2,944,986 A | * 7/1960 | Powell et al. | 425/6 |
| 3,015,128 A | 1/1962 | Somerville | 425/5 |
| 3,249,657 A | * 5/1966 | Russo | 264/8 |

(List continued on next page.)

FOREIGN PATENT DOCUMENTS

| AU | 9705216 | 2/1997 |
|---|---|---|
| CA | 2069515 | 11/1993 |

OTHER PUBLICATIONS

Good, W.K., Shell/AOSTRA Peace River Horizontal Well Demonstration Project, A test of the Enhanced Stream Assisted Gravity Drainage Process; Conference on Heavy Crude and Tar Sands; 1995.

*Primary Examiner*—Jan H. Silbaugh
*Assistant Examiner*—Joseph S. Del Sole
(74) *Attorney, Agent, or Firm*—Kellogg Brown & Root, Inc.

(57) ABSTRACT

Disclosed is a pelletizer vessel and a prilling head assembly for use in the pelletizer vessel for prilling a hard resid material. The pellitizer vessel has an has an upright pelletizing vessel with an upper prilling zone, a sphere-forming zone below the prilling zone, a cooling zone below the sphere-forming zone, a bath below the cooling zone, and a prilling head in the prilling zone rotatable along a vertical axis and having a plurality of discharge orifices for throwing molten material radially outwardly. A vertical height of the sphere-forming zone is sufficient to allow material discharged from the prilling head to form substantially spherical liquid pellets. Nozzles are provided for spraying water inwardly into the cooling zone to cool and at least partially solidify the liquid pellets to be collected in the bath. The prilling head assembly has a a feed inlet to allow for the introduction of resid material, rotary union with a fluid tight seal, a rotatable pipe to convey a resid material to the prilling head, a drive wheel to provide rotation to the rotatable pipe, a support housing having a mount for attachment to the pellitizer vessel, and a prilling head with a flow passage in fluid communication with the rotatable pipe and radially offset orifices. Bearings are provided for stablizing and guiding the rotatable pipe. Inert gas is introduced into the annular spaces of the support housing to prohibit foreign matter.

38 Claims, 7 Drawing Sheets

U.S. PATENT DOCUMENTS

| | | | |
|---|---|---|---|
| 3,310,612 A | 3/1967 | Somerville | 264/4 |
| 3,461,489 A | 8/1969 | Tuttle | 425/72.1 |
| 3,462,359 A | 8/1969 | Fauber | 208/23 |
| 3,598,716 A | 8/1971 | Fauber | 208/6 |
| 3,607,993 A | 9/1971 | Tuttle | 264/8 |
| 3,751,278 A | 8/1973 | Alexander | 106/284.1 |
| 3,779,892 A | 12/1973 | Forster et al. | 208/6 |
| 3,868,315 A | 2/1975 | Forster et al. | 208/6 |
| 3,877,918 A | 4/1975 | Cerbo | 65/142 |
| 3,935,093 A | 1/1976 | Senolt et al. | 208/6 |
| 3,989,616 A | 11/1976 | Pagen et al. | 208/6 |
| 3,996,026 A | 12/1976 | Cole | 48/197 R |
| 4,001,091 A | 1/1977 | Senolt et al. | 196/46 |
| 4,052,290 A | 10/1977 | Cushman et al. | 208/6 |
| 4,123,206 A | 10/1978 | Dannelly | 425/5 |
| 4,207,117 A | 6/1980 | Espenscheid et al. | 106/278 |
| 4,218,409 A | 8/1980 | Dannelly | 264/4 |
| 4,283,230 A | 8/1981 | Clementoni et al. | 106/274 |
| 4,303,433 A * | 12/1981 | Torobin | 65/21.4 |
| 4,332,671 A | 6/1982 | Boyer | 208/92 |
| 4,386,895 A | 6/1983 | Sodickson | 425/5 |
| 4,526,588 A | 7/1985 | Lusch | 48/202 |
| 4,657,702 A | 4/1987 | Vasconcellos et al. | 252/373 |
| 4,681,700 A | 7/1987 | Vasconcellos et al. | 252/373 |
| 4,684,336 A * | 8/1987 | Brotz | 425/8 |
| 4,931,231 A | 6/1990 | Teppo et al. | 264/13 |
| 4,933,067 A | 6/1990 | Rankel | 208/45 |
| 4,950,307 A | 8/1990 | Najjar et al. | 44/281 |
| 4,975,176 A | 12/1990 | Begliardi et al. | 208/3 |
| 5,046,559 A | 9/1991 | Glandt | 166/248 |
| 5,215,146 A | 6/1993 | Sanchez | 166/272.3 |
| 5,228,977 A | 7/1993 | Moran et al. | 208/44 |
| 5,318,124 A | 6/1994 | Ong | 166/272.3 |
| 5,320,739 A | 6/1994 | Moran et al. | 208/44 |
| 5,628,937 A * | 5/1997 | Oliver et al. | 264/9 |
| 5,637,350 A | 6/1997 | Ross | 427/212 |
| 5,932,186 A | 8/1999 | Romine et al. | 423/447.2 |
| 5,939,474 A | 8/1999 | Gooswilligen et al. | 524/68 |
| 6,062,487 A * | 5/2000 | Bedetti | 239/7 |

* cited by examiner

US 6,499,979 B2

PRILLING HEAD ASSEMBLY FOR PELLETIZER VESSEL

CROSS REFERENCE TO RELATED APPLICATION

This application is a continuation-in-part of U.S. Ser. No. 09/447,408, by Jon Morretta and Murugesan Subramainian, filed Nov. 23, 1999, now U.S. Pat. No. 6,331,245.

FIELD OF THE INVENTION

The present invention is directed to an apparatus for pelletizing a petroleum resid wherein the resid is prilled in a molten state using a rotating prilling head, liquid particles of the resid made by the prilling head are formed into spheres before solidifying, and the spherical particles are then quenched and solidified in substantially spherical shape. More particularly, the invention is directed to a prilling head assembly and a prilling vessel equipped with the assembly.

BACKGROUND OF THE INVENTION

The residue from petroleum distillation has a wide number of uses, including paving asphalt and fuel. Paving grade asphalt used in road construction must meet a number of specifications, including the latest SHRP specification, viscosity (usually 200–5000 poises at 60° F.), penetration (usually greater than 30 to 200 dmm), penetration ratio 15° F./25° F. (usually above about 0.3), ductility, temperature susceptibility, and others.

Contacting the petroleum resid fraction with air at an elevated temperature, also referred to as "air blowing," is a conventional way to improve the characteristics of certain grades of resid to make them suitable for use as a paving; asphalt. However, the prior art does not appear to disclose the practical application of air blowing a relatively soft resid to obtain a relatively hard resid that can be pelletized for storage and/or shipment. As used in the present specification and claims, a "soft reside " or a "low softening point temperature" refers to a petroleum residue having a penetration above 0 and Ring and Ball (R&B) softening point temperature below 200° F. A "hard resid" or a "high softening point temperature" refers to a petroleum residue with a penetration of essentially 0 and R&B softening point temperature above 200° F.

Representative references disclosing resid or asphaltene air blowing equipment and methodology include U.S. Pat. No. 2,616,837 to Roediger; U.S. Pat. No. 2,627,498 to Firik et al; U.S. Pat. No. 2,861,939 to Biribauer et al; U.S. Pat. No. 2,889,296 to Morris et al; U.S. Pat. No. 3,462,359 to Fauber; U.S. Pat. No. 3,598,716 to Fauber; U.S. Pat. No. 3,751,278 to Alexander; U.S. Pat. No. 3,779,892 to Forster et al; U.S. Pat. No. 3,868,315 to Forster et al; U.S. Pat. No. 3,935,093 to Senolt et al; U.S. Pat. No. 3,989,616 to Pagen et al; U.S. Pat. No. 4,052,290 to cushman et al; U.S. Pat. No. 4,207,117 to Espenscheid et al; U.S. Pat. No. 4,283,230 to Clementoni et al; U.S. Pat. No. 4,332,671 to Boyer; U.S. Pat. No. 4,933,067 to Rankel; U.S. Pat. No. 4,975,176 to Begliardi et al; U.S. Pat. No. 5,228,977 to Moran et al; U.S. Pat. No. 5,320,739 to Moran et al; U.S. Pat. No. 5,932,186 to Romine et al; and U.S. Pat. No. 5,939,474 to Gooswilligen et al. Air blowing technology is commercially available under the trade designation BITUROX, for example.

In contrast to paving asphalt, the specifications for fuel grade petroleum resid that is burned as a fuel are much less stringent. The resid generally has a higher calorific value and better combustion characteristics compared to coal and petroleum coke, which is why resid has been added to coal and coke as an additive to improve calorific value and aid combustion. However, heavy resid with a low softening point temperature is difficult to store and/or transport without significant handling and packaging requirements. Over time, even when they initially may appear to be solid at ambient conditions, these low-softening-point-materials exhibit liquid flow characteristics. These materials have typically been transported as a semi-solid product, as a neat liquid product, or as a cutback liquid product. The semi-solid form must be shipped in a closed container to prevent leakage and spillage, is usually reheated prior to use, and the high cost, of packaging and handling the material in this manner usually limits application to relatively small volumes of product.

As a neat liquid product, heavy resid is maintained at elevated temperatures sufficient to keep the material in a liquid state. This method is also expensive and has limited practical application.

As a cutback liquid product, heavy resid is mixed with light aromatic hydrocarbon cutterstocks to maintain the mixture in a liquid state at lower temperatures. As a result, the lighter hydrocarbons with which the resid is blended are substantially downgraded in value.

A pelletized resid that remains solid would be free flowing and could be readily stored, packaged, transported and handled. Previous attempts at pelletizing resid with a low softening point temperature have relied on encapsulating the resid with a solid coating. Coating the resid complicates the encapsulating process, results in a compositionally heterogeneous product, adds cost due to the generally expensive nature of the coating material, is not always effective due to rupture or breakage of the coating and/or to dissolution of the coating by water if the coating is water soluble, and the coating can adversely affect the combustion characteristics of the resid. Representative references teaching various encapsulation apparatus and methodology include U.S. Pat. No. 3,015,128 to Somerville; U.S. Pat. No. 3,310,612 to Somerville; U.S. Pat. No. 4,123,206 to Dannelly; U.S. Pat. No. 4,128,409 to Dannelly; U.S. Pat. No. 4,386,895 to Sodickson; and U.S. Pat. No. 5,637,350 to Ross.

U.S. Pat. No. 4,931,231 to Teppo et al discloses a method for manufacturing discrete pellets of asphaltic material by flowing the asphaltic material in molten form as an elongated annular stream directly into cooling water to solidify and shatter the elongated stream into discrete solid particles. The particles formed as a result of shattering are not spherical and have undesirable flow and/or handling characteristics. For example, the particles may be dust-free when made, but because of any jagged edges, might result in formation of considerable dust upon handling.

U.S. Pat. No. 3,877,918 to Cerbo discloses apparatus for producing spherical glass particles by centrifugally projecting solid crushed glass particles into the draft tube of a bead furnace using a rotary receptacle. The rotary receptacle forms a cloud of evenly dispersed solid glass particles, which are directed upwardly into the expansion chamber of the furnace to heat and shape the glass-particles by surface tension into spheres.

The prior art does not appear to disclose a method or apparatus for making spherical petroleum resid pellets by feeding the resid in a molten state to a rotating prilling head, allowing the resid discharged from the prilling head to break into particles and form into spheres due to the surface tension of the molten resid as the particles pass by gravity through a high temperature zone, and then quenching the molten material in a cooling medium to solidify the particles in their substantially spherical form. Nor does there appear to be any prior disclosure of substantially spherical, compositionally homogeneous. (uncoated) petroleum resid pellets having a high softening point temperature, nor of a method or apparatus for making spherical resid pellets for ambient temperature storage and shipment for use in combustion processes as a fuel or fuel additive.

SUMMARY OF THE INVENTION

The present invention produces substantially spherical particles from a material such, as petroleum resid that is normally solid at ambient temperature, but can be liquefied at an elevated temperature. The present invention produces a compositionally homogeneous pelletized petroleum resid product suitable for ambient-temperature storage and shipment prior to an end use. The pellets are relatively hard and have a softening point temperature above 200° F. so that they do not stick together at ambient storage and transportation temperatures. If the resid feedstock is not sufficiently hard, it can be hardened by oxidation with air at elevated temperature. The resid is prilled at molten temperatures using a rotating prilling head that discharges the molten resid into a high temperature vapor space. As the resid is thrown away from the prilling head and falls by gravity, it breaks into small pieces that form into spheres while liquid. After the spheres are formed in a liquid state, the pellets are cooled and solidified, for example, by passing the spheres through a water mist and collecting them in a water bath.

Broadly, the invention provides a process for pelletizing a petroleum resid. The process comprises (1) heating the resid to a temperature at which it is in a liquid state, (2) continuously feeding the molten resid to an inlet of a centrifugal prilling head comprising a plurality of radially arrayed discharge orifices in fluid communication with, the inlet, (3) rotating the prilling head to discharge the resid from the orifices into free space near an upper end of a pelletizing vessel having a diameter larger than a throw-away diameter of the discharged resid, (4) allowing the discharged resid to break apart and form into substantially spherical pellets in a high temperature zone of the pelletizing vessel at which the resid is liquid, and to fall downwardly into contact with a cooling medium in which the resid is insoluble and which is maintained at a temperature effective to cool/solidify the pellets, (5) withdrawing a mixture of the solidified pellets and the cooling medium from the pelletizing vessel, and (6) substantially separating the pellets from the cooling medium.

The invention also provides a prilling head assembly for a vessel for pelletizing a petroleum resid. The prilling head assembly is preferably mountable on the upper end of a pelletizing vessel for throwing feed material radially outward into an upper prilling zone in the vessel. The assembly includes: (1) a rotary union including a housing, a feed inlet, a rotatable pipe depending from the housing, a flow path between the feed inlet and an upper end of the rotatable pipe disposed within the housing, and a fluid tight seal between an exterior surface of the pipe and an opening in the housing; (2) a lower end of the rotatable pipe connected to a prilling head having a flow passage in fluid communication between an outlet from the-lower end of the rotatable pipe and a plurality of orifices radially offset from an axis of the rotatable pipe; (3) a support housing having a mount for attachment to the pelletizing vessel and upper and lower bearings adjacent respective upper and lower ends of the support housing for rotatably receiving the rotatable pipe; and (4) a drive wheel secured to the rotatable pipe. Preferably, the prilling head assembly further comprises a detachable coupling on the rotatable pipe between the rotary union and the upper bearing. The upper bearing is preferably mounted to the top flange, and the lower bearing to a lower bearing mount flange.

The mount in the prilling head assembly preferably includes a mounting flange and the support housing includes a fixed pipe with a larger inside diameter than the outside diameter of the rotatable pipe. The fixed pipe depends from the mounting flange. The prilling head assembly preferably includes a lower dust seal at a lower end of the fixed pipe adjacent an opening in a lower end panel located between the lower bearing and the prilling head, and an upper dust seal adjacent an opening in the mounting flange receiving the rotatable pipe. The support housing preferably includes a port for introducing inert gas into the annulus between the fixed pipe and the rotatable pipe.

The support housing preferably includes a top flange secured by a bracket in spaced. relation above the mounting flange. The upper bearing is secured to the top flange. The drive wheel can be conveniently disposed between the top flange and the mounting flange. The discharge orifices in the prilling head are preferably arrayed at a circumference of the prilling head in a plurality of vertically spaced upper and lower rows. The lower row or rows can be disposed at a smaller diameter from the axis of rotation of the prilling head than the upper row or rows. The prilling head preferably has a circumference tapered from an uppermost row of orifices to a lowermost row, and can be rotated at from about 100 to about 5000 rpm. The prilling head preferably has a diameter from about 2 inches to about 5 feet, the orifices a diameter from about $\frac{1}{32}$-inch to about 1 inch and a production capacity of from about 1 to about 1000 lbs/hr of resid per orifice, the throw-away diameter from about 1 foot to about 15 feet, and the pellets a size range from about 0.1 mm to about 10 mm.

The cooling medium is preferably water, and the water bath is maintained in the pelletizing vessel at a temperature from about 40° to about 190° F. The water is preferably introduced into the pelletizing vessel as an inwardly directed spray, e.g. a fine mist, in a cooling zone above the bath to-at least partially cool the spherical pellets before they enter the bath. The slurry withdrawn from the pelletizing vessel is preferably no more than about 50° F. warmer than the water introduced into the cooling zone. The process can also include the steps of collecting water from the separation step, and filtering, cooling, and recirculating the cooled water to the cooling zone.

The process can also include the step of venting vapor near an upper end of the pelletizing vessel and/or the step of heating an upper end of the pelletizing vessel to maintain a substantially constant temperature zone in the vicinity of the prilling head. The process can further comprise the step of transporting the recovered pellets at ambient temperature to a location remote from the pelletization vessel where the pellets are used for combustion, as a combustion improver or additive to coke and/or coal, in admixture with a cutter-stock for fuel oil, or the like.

The petroleum resid fed to the heating step preferably has a penetration of essentially 0 and a softening point temperature from 200° to 400° F., more preferably having a-softening point temperature from about 230° to about 350° F. The resid is preferably obtained as the asphaltene-rich fraction from a solvent deasphalting process. The resid feed is preferably heated to a temperature from about 350° to about 700° F., and the pellets recovered from the separation can have a residual water content of from 0.1 to 10 weight percent. The process can also include burning the transported resid pellets, for example, as a combustion fuel, as an additive in the combustion of coal and/or petroleum coke or as a blend component with cutterstock in a fuel oil.

The process can further comprise the step of contacting a soft petroleum resid with air at a temperature from about 350° to about 700° F. for a period of time effective to reduce the penetration of the resid to essentially 0 and increase the softening point temperature to above 200° F. to form a hard resid suitable for use as the resid feed in the heating step. The soft resid can be obtained as atmospheric tower resid or the asphaltene-rich fraction from solvent deasphalting of a petroleum residue, especially propane deasphalting. The air-contacting step is preferably for a period of time from about 2 to about 5 hours.

In another aspect of the invention, there is provided a process for making petroleum resid pellets from a soft petroleum resid. The process includes contacting a soft resid having a penetration greater than 0 and a softening point temperature below about 200° F. with air at a temperature from about 350° to about 700° F. for a period of time effective to form a hard resid having a penetration of essentially 0 and a softening point temperature above 200° F., and forming the hard resid into pellets. The process can also include burning the pellets as a fuel or fuel additive, for example.

In a further aspect of the invention, there is provided a pelletizer for making spherical pellets from a material such as petroleum resid which is normally solid at ambient temperature, but which can be liquefied at elevated temperature. The pelletizer includes an upright pelletizing vessel having an upper prilling zone, a hot sphere-forming zone below the prilling zone, a cooling zone below the sphere-forming zone, and a lower liquid cooling bath below the cooling zone. A prilling head is centrally disposed in the prilling zone, and is rotatable along a vertical axis. The prilling head has a plurality of discharge orifices for throwing the molten materially radially outwardly. A throw-away diameter of the prilling head is less than an inside diameter of the pelletizing vessel. A process line is provided for supplying the material to the prilling head. A vertical height of the sphere-forming zone is sufficient to allow liquid material discharged from the prilling head to form into a substantially spherical shape while in the liquid state. Nozzles can be provided for spraying liquid cooling medium, preferably water in the form of a mist, inwardly into the cooling zone to cool and solidify at least an outer surface of the spheres to be collected in the bath. Another line is provided for supplying water to the nozzles and the bath to maintain the relatively low temperature of the bath in the pelletizing vessel. A further line is provided for withdrawing a slurry of the pellets in the bath water. A liquid-solid separator is provided for dewatering the pellets from the slurry.

The pelletizer can also include an oxidation vessel for contacting a soft resid, having a penetration greater than 0, and preferably less than 100 dmm, with air at a temperature from about 350° to about 700° F. for a period of time effective to reduce the penetration of the resid to essentially 0 and to increase the softening point temperature to above 200° F. to form a hard resid suitable for feed to the prilling head. The pelletizer can preferably further include a solvent deasphalting unit for obtaining the soft resid as the asphaltene fraction from solvent de-asphalting of a petroleum residue.

The discharge orifices of the prilling head are preferably arrayed at a circumference of the prilling head in a plurality of vertically spaced upper and lower rows wherein the lower row or rows are disposed at a smaller diameter from the axis of rotation of the prilling head than the upper row or rows. The prilling head can have a circumference tapered, either continuously or stepped, from an uppermost row at a relatively large diameter to a lowermost row at a relatively small diameter. In one alternative embodiment, the prilling head preferably comprises a plurality of rings of different diameter with orifices formed in an outer circumference of each ring, wherein the rings are secured to the prilling head in a descending fashion, each successively lower ring having a smaller diameter than the preceding ring. The pelletizer preferably has a drive for rotating the prilling head at from about 100 to about 5000 rpm wherein the prilling head has a diameter from about 2 inches to about 5 feet, and wherein the orifices have a diameter from about $\frac{1}{32}$-inch to about 1-inch and a production capacity of from about 1 to about 1000 lbs/hr of molten material per orifice.

The cooling medium is preferably water and the pelletizer also preferably includes a cooler for maintaining the bath in the pelletizing vessel at a temperature from about 600 to about 190° F. The aqueous bath preferably contains a minor amount of a non-foaming surfactant. The vessel preferably has a conical bottom containing the bath and a discharge at a lower end of the conical bottom for feeding the slurry into the withdrawal line. A filter can be provided for filtering water recovered from the liquid-solid separator, a cooler provided for cooling the filtered water and a recirculation line provided for recirculating the cooled water to the supply line.

A vent line is preferably provided for withdrawing vapor from the pelletizing vessel near an upper end thereof. A heater can also be provided for heating an upper end of the vessel to maintain a substantially constant temperature zone adjacent the prilling head, particularly during startup operations. In one preferred embodiment, a line is provided for introducing steam into the sphere-forming zone.

The liquid-solid separator preferably comprises a vibrating screen. The pelletizer can further comprise a conveyor belt for transporting the pellets from the vibrating screen to ambient temperature storage, packaging and/or shipment.

In another aspect, the present invention provides substantially spherical, homogeneous petroleum resid pellets suitable for combustion having a size range between 0.1 and 10 mm, a penetration of essentially 0, a softening point temperature from about 200° to about 400° F., preferably from about 230° to about 350° F., a residual water content of from 0.1 to 10 weight percent, and a sulfur content less than 10 weight percent. The resid pellets can comprise a hard resid produced by a process comprising contacting a soft resid with air at an elevated temperature for a period of time effective to convert the soft resid to hard resid, preferably from 2 to 5 hours.

DETAILED DESCRIPTION

Figure 1:
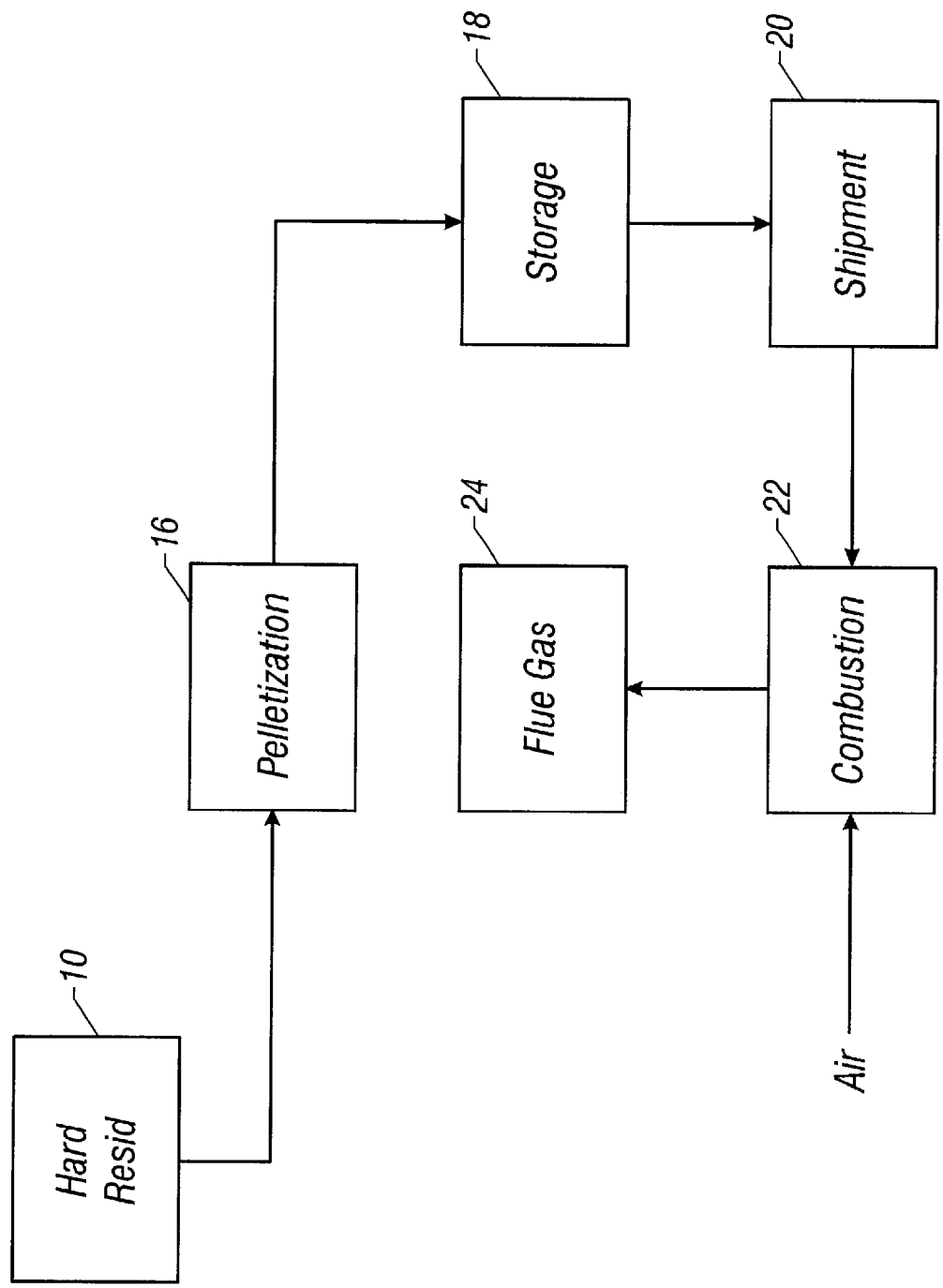
FIG. 1 is a simplified process flow diagram of one embodiment of the method of pelletizing a hard petroleum resid according to the present invention.

The petroleum resids which are suitable for pelletization in accordance with the present invention include any asphaltene-rich material, particularly the asphaltene fraction from solvent deasphalting with propane or another solvent as practiced in solvent deasphalting process technology commercially available under the trade designations ROSE, DEMEX, SOLVAHL and the like. The term "resid" as used in the present specification and claims also encompasses other asphaltene-containing sources from petroleum resids such as, for example, atmospheric tower bottoms, vacuum tower bottoms, visbreaker residue, thermal cracker residue, soaker residue, hydrotreater residue, hydrocracker residue, and the like. The resid can have a softening point temperature from 0° to 400° F., a penetration of from 0 to 100 dmm, and a sulfur content from 0 to 10 weight percent. Resids from propane deasphalting and atmospheric tower bottoms typically have a softening point temperature below 200° F. Representative petroleum resids and their properties are listed in Table 1 as follows:

TABLE 1

| Resid | Source or or process | R&B (° F.) | Penetration (dmm) | Sulfur (wt %) |
|---|---|---|---|---|
| Asphaltenes | Solvent deasphalting | 0–400 | 0–100 | 0–10 |
| | Propane deasphalting | 0–200 | 0–100 | 0–10 |
| | ROSE process | 0–400 | 0–100 | 0–10 |
| | DEMEX process | 0–400 | 0–100 | 0–10 |
| | SOLVAHL process | 0–400 | 0–100 | 0–10 |
| Atmospheric | Atmospheric tower | 0–200 | 0–100 | 0–10 |
| Vacuum | Vacuum tower | 0–400 | 0–100 | 0–10 |
| Visbroken | Visbreaker | 0–400 | 0–100 | 0–10 |
| Thermal/ Catalytic | Thermal cracker | 0–400 | 0–100 | 0–10 |
| | Soaker | 0–400 | 0–100 | 0–10 |
| | Hydrotreater | 0–400 | 0–100 | 0–10 |
| | Hydrocracker | 0–400 | 0–100 | 0–10 |

Petroleum resids can be divided into two groups, soft arid hard resids, that are differentiated from each other by means of their R&B softening point temperatures as measured per ASTM D3461-85 and penetration as measured by ASTM D5 at 250° F. The R&B softening point temperatures of soft resids will generally be below 200° F. and their penetrations greater than 0; the hard resids will have R&B softening point temperatures of approximately 200° F. and higher and a penetration of essentially 0. The R&B softening point temperature for a petroleum resid is defined as the temperature at which the viscosity of the resid is approximately 1,000,000 cSt and phase transformation from solid to semisolid occurs. The pellets produced from the softer resids may stick together and may have poor storage and transportation capabilities at ambient conditions. Thus, the soft resids are generally unsuitable for pelletization commercially unless they are pretreated to chemically modify (by air oxidation or another appropriate process) these materials or encapsulate the resulting pellets with an impervious coating. In contrast, the pellets produced from hard resids can have good storage and transportation capabilities without pretreatment.

According to the present invention, the soft resids are first oxidized in a conventional air-blowing reactor typically operating at mild pressure (<50 psig) and moderate temperature (350° to 700° F.) by sparging air. The resid hardens with air blowing time at constant temperature and air flow rate per unit weight. The typical air blowing time is 2 to 5 hours. However, the air blowing time can be reduced by increasing the temperature and/or the air flow rate per unit weight of the resid. Some of the resins present in the soft resid are oxidized and converted into asphaltenes. Some of the resins and asphaltenes are converted into light hydrocarbons, light hydrocarbon liquids and off gases (containing CO, $CO_2$, gaseous hydrocarbons and $H_2$). The air blowing process generally reduces the heating value of the resid, but increases the R&B softening point temperature and oxygen content of the resid. The oxidized resid with R&B above 200° F. is suitable for pelletization.

Figure 2:
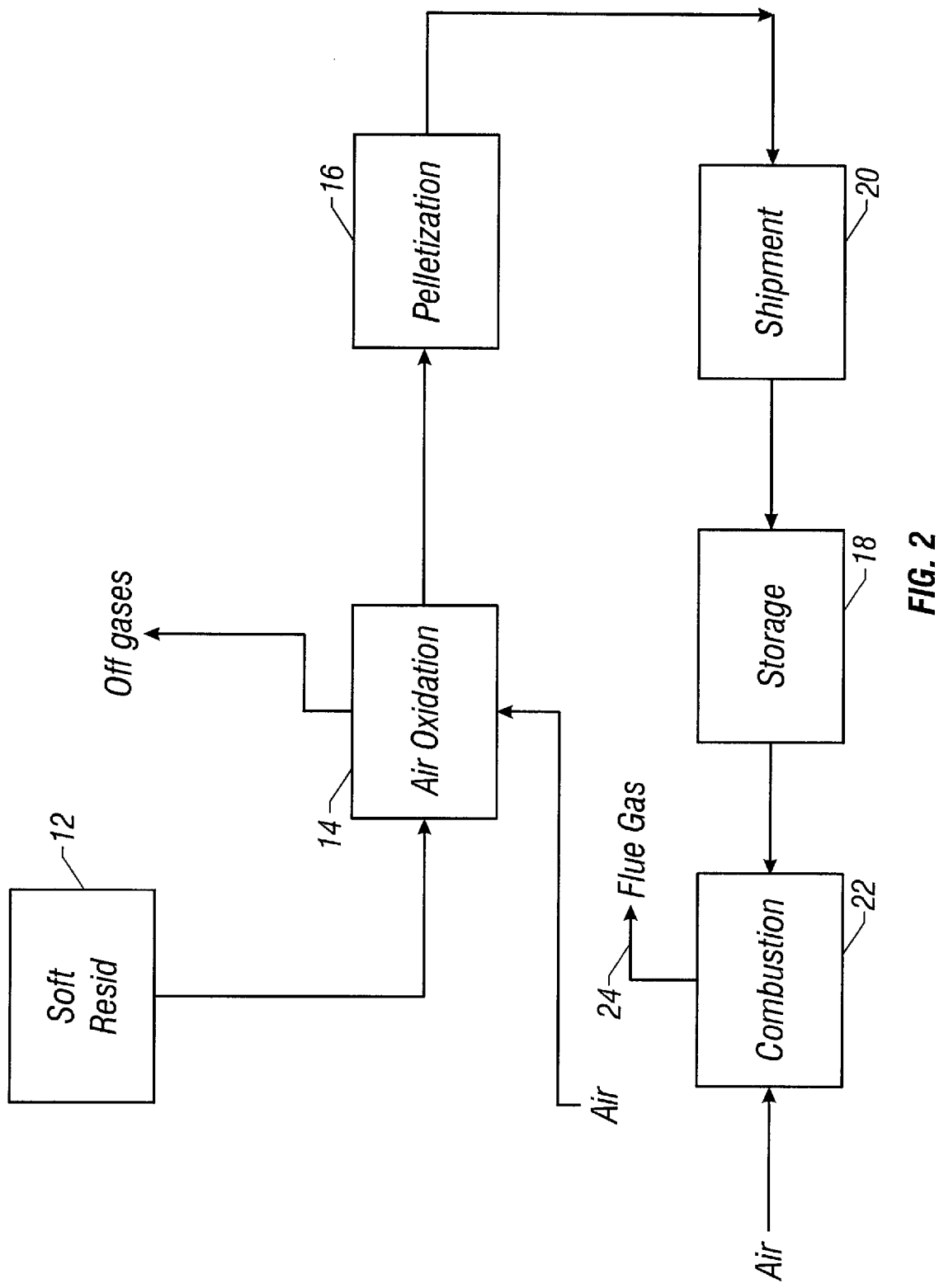
FIG. 2 is a simplified process flow diagram of an alternate embodiment of the method of FIG. 1 including air oxidation of a soft resid to convert it to hard resid prior to prilling.

This invention is a process to produce pellets or prills from both soft and hard petroleum resids. In accordance with one embodiment of the invention, the hard resid 10, i.e., having an initial R&B softening point temperature above 200° F., can be pelletized directly, i.e. without any pretreatment (refer to FIG. 1). The soft resid 12 is preferably first subjected to air oxidation or blowing 14 at elevated temperature and mild pressure to convert it to a hardened resid with a R&B softening point temperature of 200° F. and above to render it more suitable for pelletizing (FIG. 2). The pelletization of both the hard and hardened soft resids is performed using a pelletizing step 16 employing a centrifugal prilling device. The centrifugal prilling device has a high prilling capacity, flexibility to produce pellets of various sizes and from a variety of resids, ease of operation, self-cleaning capability, and ease of startup and shut down.

The pelletization 16 produces pellets that are substantially spherical with good storage, transportation and fuel characteristics. The pellets from the pelletization 16 ate optionally sent to storage 18 (FIG. 1) on a pad or in a pit, silo, tank or drum, or storage can include packaging in bags, boxes, drums or the like. The pellets can then be sent for shipment 20 by truck, rail car, ship, barge or the like. The pellets can also be subject to storage after shipment as seen in FIG. 2. Desirably, the pellets are then burned with air in conventional combustion equipment 22 appropriately designed for resid combustion as is known in the art to obtain a flue gas 24 from which heat is typically recovered. The invention is not necessarily, however, limited to combustion of the pellets, which may have other utilities.

Figure 3:
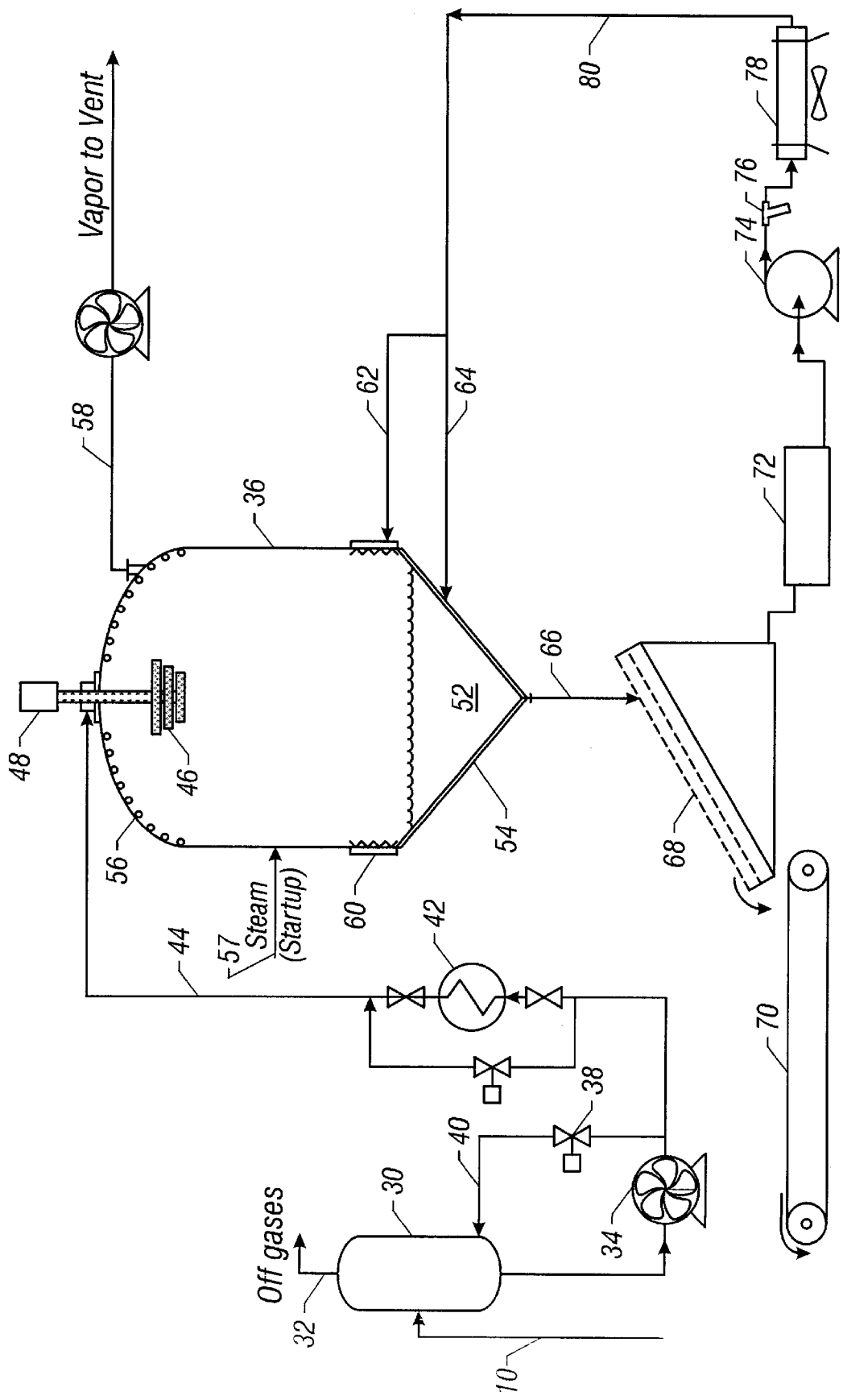
FIG. 3 is a simplified flow diagram of a pelletizer according to an embodiment of the invention.

With reference to FIG. 3, the hard resid 10 (or hardened soft resid from an air blowing unit or other processing units that can produce hardened soft resids) is fed to surge drum 30. The purpose of the surge drum 30 is to remove residual solvent contained in the resid (e.g., from asphaltenes recovered from solvent deasphalting processes), which is vented overhead in line 32, and also to provide a positive suction head for positive displacement pump 34. The positive displacement pump 34 delivers the resid to the pelletizer vessel 36 at a desirable flow rate. A spill back arrangement, including pressure control valve 38 and return line 40, maintains resid levels in the surge drum 30 and also adjusts for the fluctuations in pellet production. The resid from the positive displacement pump 34 flows through resid trim heater 42 where the resid is heated to the desired operating temperature for successful pelletization. A typical outlet temperature from the resid trim heater 42 ranges from about 350° to about 600° or 700° F. depending on the viscosity and R&B softening point temperature of the resid.

The hot resid flows via line 44 to the top of the pelletizer vessel 36 where it passes into the rotating prilling head 46. The rotating head 46 is mounted directly on the top of the pelletizer vessel 36 and is rotated using an electrical motor 48 or other conventional driver. The rotating head 46 is turned at speeds in the range of from about 100 to about 5000 RPM.

Figure 4:
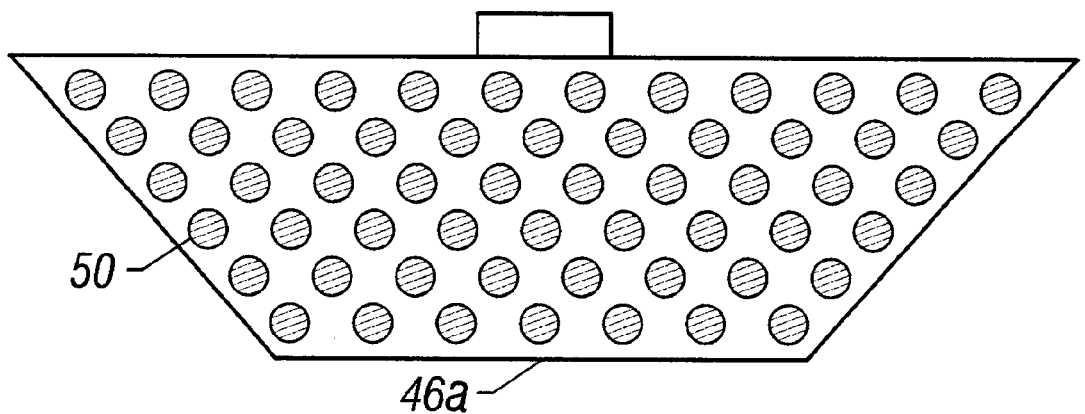
FIG. 4 is a simplified schematic of one embodiment of a prilling head according to the present invention.
Figure 5:
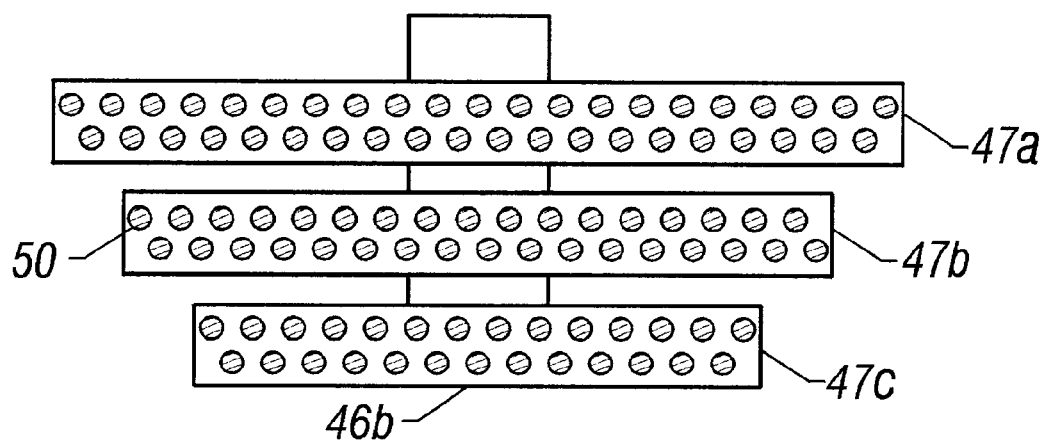
FIG. 5 is a simplified schematic of an alternative embodiment of a prilling head according to the present invention.
Figure 6:
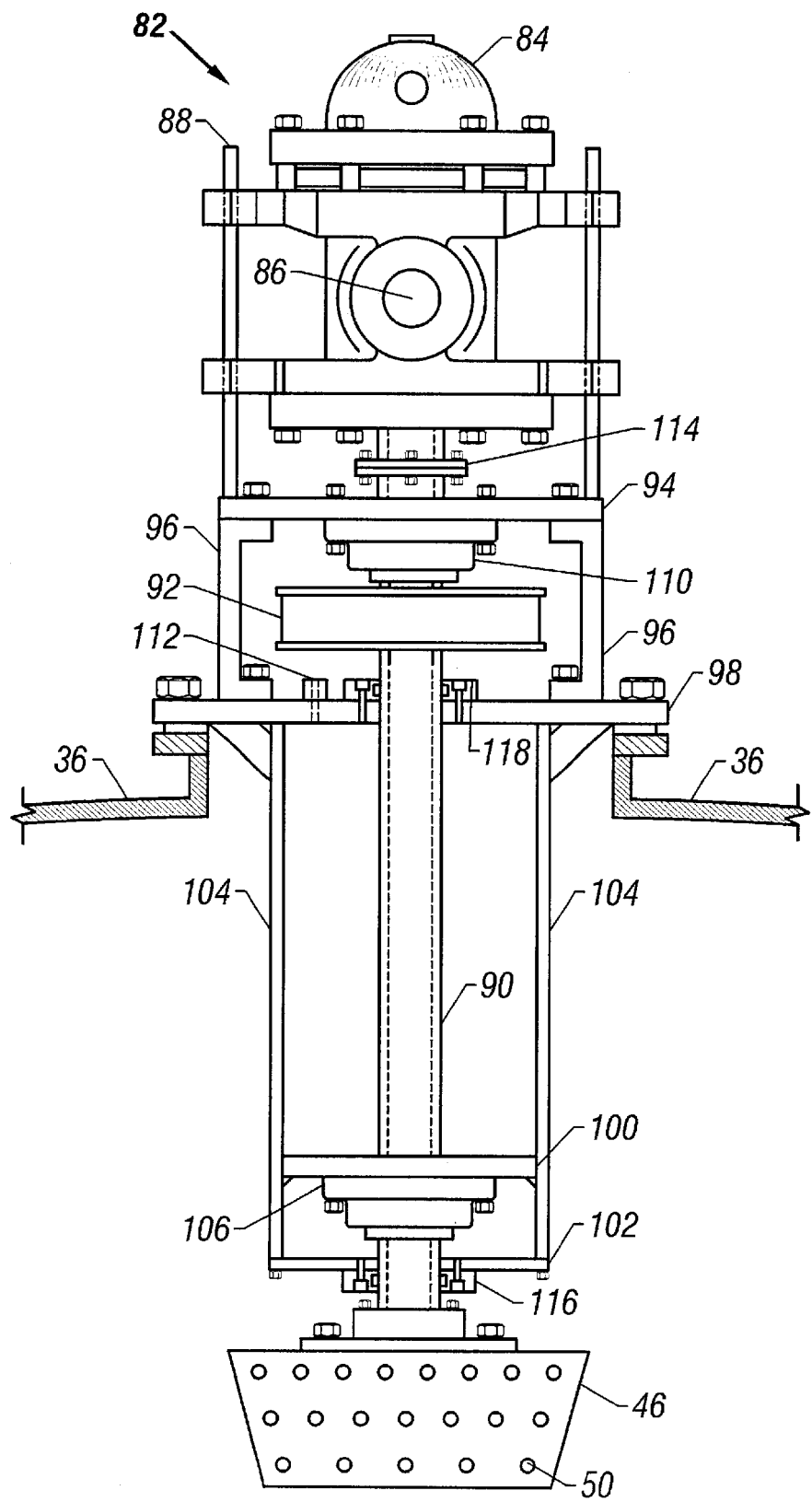
FIG. 6 is an elevational view of a prilling head assembly according to, one embodiment of the present invention.
Figure 7:
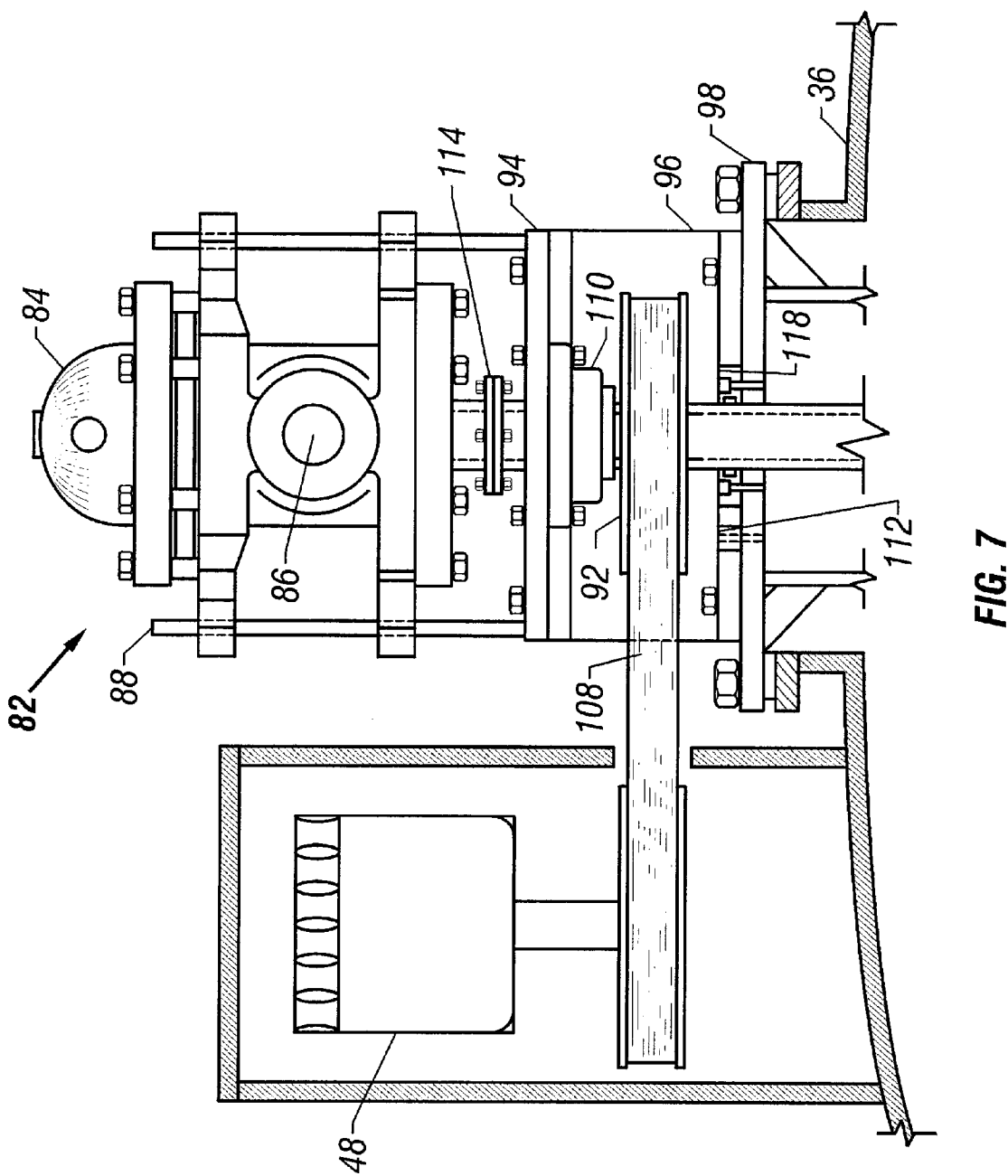
FIG. 7 is an enlarged view partly in section of an upper portion of the prilling head assembly of FIG. 6.

The rotating head 46 can be of varying designs including, but not limited to the tapered basket 46a or multiple diameter head 46b designs shown in FIGS. 4 and 5, respectively. The orifices 50 are evenly spaced on the circumference of the heads 46a, 46b in one or more rows in triangular or square pitch or any other arrangement as discussed in more detail below. The orifice 50 diameter can be varied from about 0.03 to about 1 inch (about 0.8 to 25 mm to produce the desired pellet size and distribution. The combination of the rotating head 46 diameter, the RPM, the orifice 50 size and fluid temperature (viscosity) controls the pellet size and size distribution, resid throughput per orifice and the throw-away diameter of the pellets. As the resid enters the rotating head 46, the centrifugal force discharges long, thin cylinders of the resid into the free space at the top of the pelletizer vessel 36. As the resid travels outwardly and/or downwardly through the pelletizer vessel 36, the resid breaks up into spherical pellets as the surface tension force overcomes the combined viscous and inertial forces. The pellets fall spirally into the cooling water bath 52 (see FIG. 3) that is maintained in a preferably conical bottom 54 of the pelletizer vessel 36. The horizontal distance between the axis of rotation of the rotating head 46 and the point where the pellet stops travelling away from the head 46 and begins to fall downwardly is called the throw-away radius. The throw-away diameter, i.e. twice the throw-away radius, is preferably less than the inside diameter of the pelletizing vessel 36 to keep pellets from hitting the wall of the vessel 36 and accumulating thereon.

Steam, electrical heating coils or other heating elements 56 may be provided inside the top section of the pelletizer vessel to keep the area adjacent the head 46 hot while the resid flows out of the rotating head 46. Heating of the area within the top section of the pelletizer vessel 36 is used primarily during startup, but can also be used to maintain a constant vapor temperature within the pelletizer vessel 36 during regular operation. If desired, steam can be introduced via line 57 to heat the vessel 36 for startup in lieu of or in addition to the heating elements 56. The introduction of steam at startup can also help to displace air from the pelletizer vessel 46, which could undesirably oxidize the resid pellets. The maintenance of a constant vapor temperature close to the resid feed 44 temperature aids in overcoming the viscous forces, and can help reduce the throw-away diameter and stringing of the resid. The vapors generated by the hot resid and steam from any vaporized cooling water leave the top of the vessel 36 through a vent line 58 and are recovered or combusted as desired.

The pellets travel spirally down to the cooling water bath 52 maintained in the bottom section of the pelletizer vessel 36. A water mist, generated by spray nozzles 60, preferably provides instant cooling and hardening of the surface of the pellets, which can at this stage still have a molten core. The surface-hardened pellets fall into the water bath 52 where the water enters the bottom section of the pelletizer vessel 36 providing turbulence to aid in removal of the pellets from the pelletizer vessel 36 and also to provide further cooling of the pellets. Low levels (less than 20 ppm) of one or more non-foaming surfactants from various manufacturers, including but not limited to those available under the trade designations TERGITOL and TRITON, may be used in the cooling water to facilitate soft landing for the pellets to help reduce flattening of the spherical pellets. The cooling water flow rate is preferably maintained to provide a temperature increase of from about 10° to about 50° F., more preferably from about 15° to about 25° F., between the inlet water supply via lines 62, 64 and the outlet line 66.

The pellets and cooling water flow as a slurry out of the pelletizer vessel 36 to a separation device such as vibrating screen 68 where the pellets are dewatered. The pellets can have a residual water content up to about 10 weight percent, preferably as low as 1 or even 0.1 weight percent or lower. The pellets can be transported to a conventional silo, open pit, bagging unit or truck loading facility (not shown) by conveyer belt 70. The water from the dewatering screen 68 flows to water sump 72. The water sump 72 provides sufficient positive suction head to cooling water pump 74. The water can alternatively be drawn directly to the pump suction from the dewatering screen (not shown). The cooling water is pumped back to the pelletizer through a solids removal element 76 such as, for example, a filter where-fines and solids are removed. The cooling water is cooled to ambient temperature, for example, by an air cooler 78, by heat exchange with a refinery cooling water system (not shown), or by other conventional cooling means, for recirculation to the pelletization vessel 36 via line 80.

Typical operating conditions for the pelletizer of FIG. 3 are as shown in Table 2 below:

TABLE 2

Typical Pelletizer Operating Conditions

| Condition | Range | Preferred Range |
|---|---|---|
| Resid feed temperature | 350° to 700° F. | 400 to 600° F. |
| Pressure | 1 atmosphere to 200 psig | Less than 50 psig |
| Head Diameter, in. | 2 to 60 | |
| Head RPM | 100 to 5000 | 200 to 3000 |
| Orifice Size, in. | 0.03 to 1 | Less than 0.5 |
| Orifice Pitch | Triangular or square | |
| Orifice capacity | 1 to 1000 lbs/hr per orifice | Up to 400 lbs/hr per orifice |
| Throw-away diameter | 1 to 15 feet | 2 to 10 feet |
| Cooling water in, ° F. | 40 to 165 | 60 to 140 |
| Cooling water out, ° F. | 70 to 190 | 75 to 165 |
| Cooling water ΔT, ° F. | 10 to 50 | 15 to 25 |
| Pellet size, mm | 0.1 to 10 | 0.5 to 5 |

One preferred embodiment of a prilling head assembly is seen in FIGS. 6–9. The prilling head assembly 82 is preferably mounted to the pelletizer vessel 36. The prilling head assembly 82 has a rotary union 84, a feed inlet 86, a rotatable pipe 90 depending from the rotary union 84, and a prilling head 46 at the bottom of the pipe 90. The feed inlet 86 is connected to the rotary union 84. The rotary union 84 is sealably received to an upper end of the rotatable pipe 90. The rotatable pipe 90 is securely attached to the prilling head 46. The operation of the prilling head assembly 82 begins by introduction of resid from the feed inlet 86 to the rotary union 84. The resid then passes in fluid communication from the rotary union 84 into the rotatable pipe 90. The rotatable pipe 90 conveys the resid to the prilling head 46.

The prlling head assembly 82 includes a top flange 94, multiple brackets 96, a mounting flange 98, a lower bearing mount flange 100, an end panel 102, and a support housing 104. The mounting flange 98 is used to affix the prilling head assembly 82 to the top of the pelletizer vessel 36. The support housing 104 depends from the mounting flange 98 to secure the lower bearing mount flange 100, and the lower end panel 102. The support housing 104 has a larger inside diameter than the outside diameter of the rotatable pipe 90 to define an annular space. A preferred embodiment of the support housing 104 is a fixed pipe.

The lower bearing mount flange 100 is preferably disposed between the mounting flange 98 and the end panel 102, and more preferably adjacent to the end panel 102. The lower bearing mount flange 100 provides structural support for the rotatable pipe and a means to attach a lower bearing 106. The lower bearing 106 acts as a guide and stabilizer for the rotatable pipe 90 during operation. The lower bearing 106 is commercially available, forexample, under the trademark designation DODGE.

The end panel 102 is affixed to the lower end of the support housing 104. The end panel 102 generally prevents entry of foreign material into the support housing 104 and onto the lower bearing 106, in cooperation with a lower dust seal 116.

Figure 8:
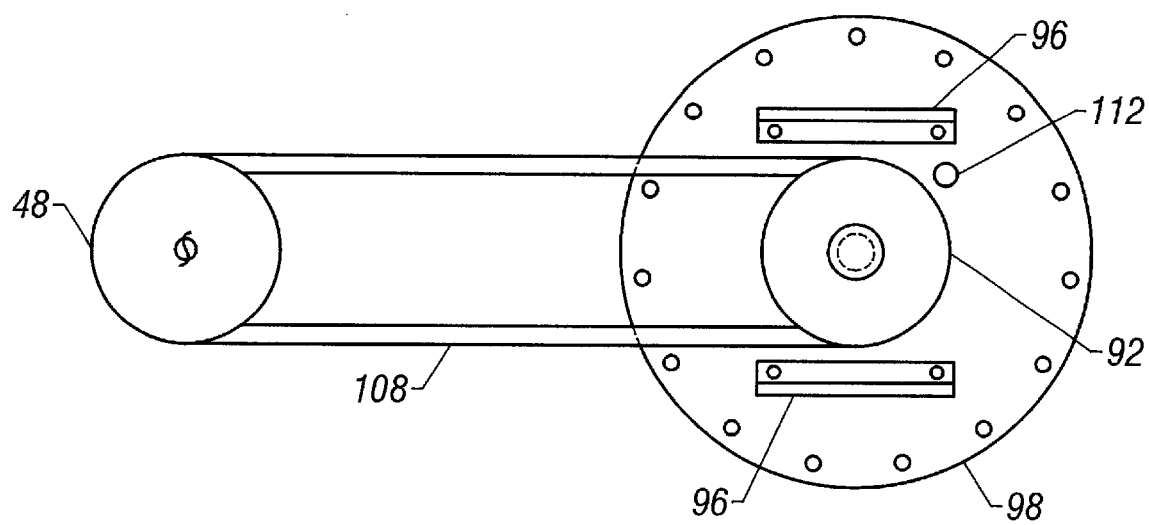
FIG. 8 is an enlarged sectional view of the prilling head assembly of FIG. 6.
Figure 9:
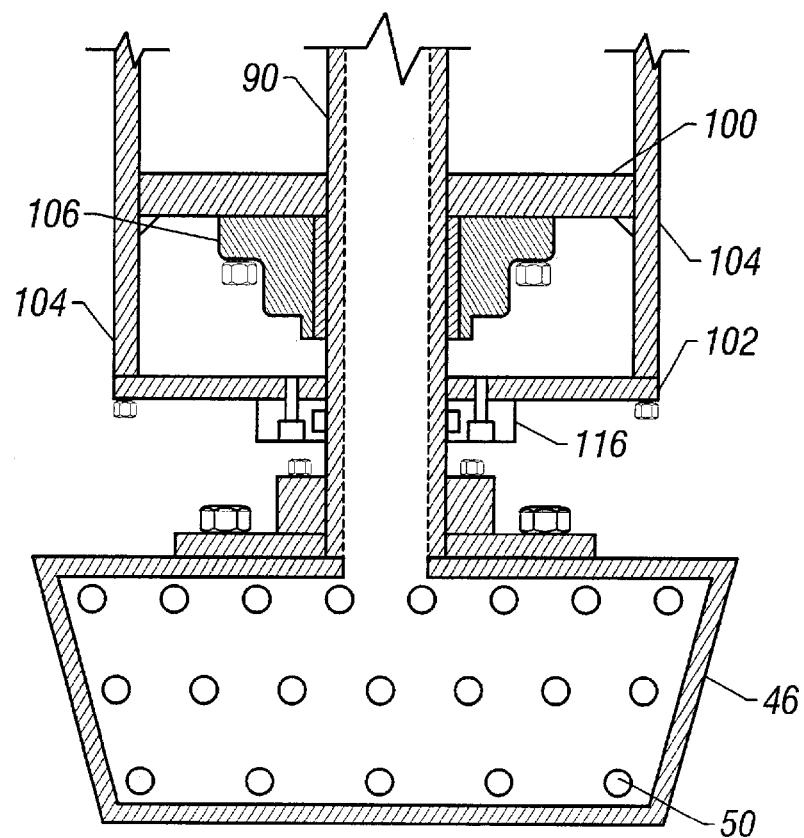
FIG. 9 is an enlarged view partly in section of a lower portion of the prilling head assembly of FIG. 6.

Multiple brackets 96 are affixed to the mounting flange to support the top flange 94. The brackets 96 allow for access to a drive belt 108, a drive wheel 92, an upper bearing 110, and an inert gas port 112. The drive wheel 92 is secured to the rotatable pipe 90 and is driven by a motor 48 and corresponding belt 108 as best seen in FIGS. 8–9. The drive wheel 92 is conveniently disposed between the top flange 94 and the mounting flange 98. The upper bearing 110 is affixed to the top flange between the top flange 94 and the mounting flange 98. The upper bearing 110 is similar to the lower bearing 106, and also serves as a guide and stabilizer for the rotatable pipe 90 during operation.

A coupling 114 is preferably disposed above the top flange 94 and below the rotary union 84. The coupling 114 facilitates rapid removal and/or replacement of the rotary union 84 for maintenance purposes. A torque bar 88 may used in conjunction with a rotary union 84 to inhibit rotation of the rotary union 84 with respect to the top flange 94.

An inert gas port 112 can be affixed to the mounting flange 98. Introduction of inert gas into the annulus between the fixed pipe 104 and the rotatable pipe 90 prevents the build up of undesirable gases and foreign material. To further inhibit particulates or flammable gases, dust seals 116, 118 are about the rotatable pipe 90 to the end panel 102 and the mounting flange 98, respectively. More preferably, the lower dust seal 116 is located at a lower end of the support housing 104 adjacent an opening in the end panel 102 between the end panel 102 and the prilling head 46. The upper dust seal 118 is preferably adjacent an opening in the mounting flange 98 receiving the rotatable pipe 90.

The present invention discloses the use of the centrifugal extrusion device or prilling head 46 to pelletize petroleum resids. The centrifugal extrusion device 46 results in a low-cost, high-throughput, flexible and self-cleaning device to pelletize the resids. The orifices 50 are located on the circumference of the rotating head 46. The number of orifices 50 required to achieve the desired production is increased by increasing the head 46 diameter and/or by decreasing the distance between the orifices 50 in a row and axially spacing the orifices 50 at multiple levels. The orifices 50 can be spaced axially in triangular or square pitch or another configuration.

The rotating head 46 can be of varying designs including, but not limited to the tapered basket 46a or multiple diameter head design 46b shown in FIGS. 4 and 5, respectively. The combination.of the head 46 diameter and the speed of rotation determine the centrifugal force at which the resid extrudes from the centrifugal head 46. By providing orifices 50 at different circumferences of the head 46b, for example, it is believed that any tendency for collision of molten/sticky particles is minimized since there will be different throw-away diameters, thus inhibiting agglomeration of resid particles before they can be cooled and solidified. If desired, different rings 47a–c in the head 46b can be rotated at different speeds, e.g. to obtain about the same centrifugal force at the respective circumferences.

Besides speed of rotation and diameter of the head 46, the other operating parameters are the orifice 50 size, resid temperature,-surrounding temperature, size of the resid flow channels inside the head 50 (not shown), viscosity and surface tension of the resid. These variables and-their relation to the pellet size, production rate per orifice, throw-away diameter and the jet breaking length are explained below.

The orifice 50 size affects the pellet size. A smaller orifice 50 size produces smaller pellets while a larger size produces larger pellets for a given viscosity (temperature), speed of rotation, diameter of the head 46 and throughput. The throw-away diameter increases with a decrease in orifice 50 size for the same operating conditions. Adjusting the speed of rotation, diameter of the head 46 and throughput, the pellets can be produced with a varied range of sizes. Depending on the throughput, the number of orifices 50 can be from 10 or less to 700 or more.

The speed of rotation and diameter of the centrifugal head 46 affect the centrifugal force at which the extrusion of the resid takes place. Increasing the RPM decreases the pellet size and increases the throw-away diameter, assuming other conditions remain constant. Increase in head 46 diameter increases the centrifugal force, and to maintain constant centrifugal force, the RPM can be decreased proportionally to the square root of the ratio of the head 46 diameters. For a higher production rate per orifice 50, greater speed of rotation is generally required. The typical RPM range is 100 to 5000. The centrifugal head 46 diameter can vary from 2 inch to 5 feet in diameter.

The viscosity of the resid generally increases exponentially with a decrease in temperature. The resid viscosities at various temperatures can be estimated by interpolation using the ASTM technique known to those skilled in the art, provided viscosities are known at two temperatures. The viscosity affects the size of the pellets produced, the higher viscosity of the resid producing larger pellets given other conditions remain constant.

EXAMPLES 1 and 2

Experiments were performed with two petroleum resids produced from solvent deasphalting, which had R&B softening point temperatures of 265° and 292° F. The experimental setup consisted of a feed tank oven, pelletizer resid pump, heated feed line, seals to transfer the resid to the centrifugal head, a multi-orifice centrifugal head, motor and belt to rotate the head, and a pellet collection tray. The resid was heated to the desired operating temperature in the drum oven and pumped to the rotating centrifugal head by the pelletizer resid pump. The pelletizer resid pump was a gear pump capable of pumping up to 5 gpm. High temperature, moderate pressure seals provided a positive leakproof connection between the feed line and the centrifugal head while transferring the resid.

The pump was calibrated before each pelletization experiment. As the resid entered the centrifugal head, the centrifugal force discharged long, thin cylinders of the resid into the free space at the top of the pelletizer. As the resid traveled downwardly in the vapor space, the resid broke up into spherical pellets as the surface tension force overcame the combined viscous and inertial forces. The pellets fell spirally into the collection tray where a cooling water bath was maintained.

The experimental centrifugal head was housed in a metal chamber and the vapor inside the chamber was maintained close to the resid feed temperature using two kerosene-fired air heaters. The centrifugal head was heated close to the resid temperature using induction coil heaters. The metal chamber was heated to overcome the viscous force to form spherical pellets, and this also reduced the throw-away diameter and inhibited stringing of the resid. Experiments were performed with single and multiple orifices and pellets were produced successfully at high throughput. While operating with multiple orifices, the pellets did not agglomerate in the vapor space or while falling into the pellet collection tray.

Examples 1 and 2 illustrate the operation of the resid pelletization apparatus using a centrifugal extrusion device according to the principles of this invention and demonstrated the ability of this apparatus to successfully produce pellets. Resid properties and operating parameters are presented in Table 3 below:

TABLE 3

| Property/Parameter | Example 1 | Example 2 |
| --- | --- | --- |
| Resid Properties | | |
| R&B softening point, ° F. | 265 | 292 |
| Sulfur, wt % | 1.7 | 4.1 |
| Storage test to 150° F. with axial load | Passed | Passed |
| Friability test, fines, wt % | <2 wt % | <2 wt % |
| Heating value, net, Btu/lb | 16,900 | 16,730 |
| Pellet Size, mm | 0.5 to 3 | 0.5 to 3 |
| Operating Parameters | | |
| Centrifugal head diameter, inches | 2.4 | 2.4 |
| Total Number of Orifices | 32 | 32 |
| Number of orifices used | 1 | 1 and 4 |
| Orifice configuration | Triangular | Triangular |
| Orifice Diameter, inches | 0.03125 | 0.03125 |
| Throw-away diameter, ft | 3.5 to 5 | 3 to 5 ft |
| Resid feed temperature, ° F. | 500 | 535 |
| RPM | 900–1500 | 900–1500 |
| Throughput per orifice, lbs/hr | 195 | 100 |

What is claimed is:

1. A pelletizer for making spherical pellets from a normally solid feed material that can be made molten at an elevated temperature, comprising:

an upright pelletizing vessel having an upper prilling zone, a sphere-forming zone below the prilling zone, a cooling zone below the sphere-forming zone, and a lower cooling bath below the cooling zone;

a centrally disposed prilling head in the prilling zone rotatable along a vertical axis and having a plurality of discharge orifices for throwing the feed material radially outwardly, wherein a throw-away diameter of the prilling head is less than an inside diameter of the pelletizing vessel;

a prilling head assembly comprising a rotary union including a housing, a feed inlet, a rotatable pipe depending from the housing, a flow path between the feed inlet and an upper end of the pipe disposed within the housing and a fluid tight seal between an exterior surface of the pipe and an opening in the housing;

a lower end of the rotatable pipe connected to the prilling head having a flow passage in fluid communication between an outlet from the lower end of the rotatable pipe and the plurality of discharge orifices wherein the discharge orifices are radially offset from an axis of the rotatabe pipe;

a support housing having a mount for attachment to the pelletizing vessel and upper and lower bearings adjacent respective upper and lower ends of the support housing for rotatably receiving the rotatable pipe;

a drive wheel secured to the rotatable pipe;

a first line for supplying the molten feed material to the feed inlet of the prilling head assembly;

a vertical height of the sphere-forming zone sufficient to allow material discharged from the prilling head to form substantially spherical liquid pellets;

nozzles for spraying a liquid cooling medium inwardly into the cooling zone to cool and at least partially solidify the liquid pellets to be collected in the bath;

a second line for supplying cooling medium to the nozzles and the bath to maintain a depth of the bath in the pelletizing vessel; and a third line for withdrawing a slurry of the pellets in the cooling medium.

2. The pelletizer of claim 1 wherein the discharge orifices are arrayed at a circumference of the prilling head in a plurality of vertically spaced upper and lower rows wherein the lower row or rows are disposed at a smaller radius from the axis of rotation of the prilling head than the upper row or rows.

3. The pelletizer of claim 2 wherein the prilling head has a circumference tapered from an uppermost row to a lowermost row.

4. The pelletizer of claim 2 wherein the prilling head comprises a plurality of rings of different diameter with orifices formed in an outer circumference of each ring, wherein the rings are secured to the prilling head in a descending fashion wherein each successively lower ring has a smaller diameter than the preceding ring.

5. The pelletizer of claim 1 further comprising a drive operatively connected to the drive wheel for rotating the prilling head at from about 100 to about 5000 rpm wherein the prilling head has a diameter from about 2 inches to about 5 feet, and wherein the orifices have a diameter from about $\frac{1}{32}$-inch to about 1-inch and a production capacity of from about 1 to about 1000 lbs/hr of the feed material per orifice.

6. The pelletizer of claim 1 further comprising a heater for heating an upper end of the vessel to maintain a substantially constant temperature zone adjacent the prilling head.

7. The pelletizer of claim 1 further comprising a fourth line for introducing steam into the sphere-forming zone.

8. The pelletizer of claim 1 further comprises a detachable coupling in the rotatable pipe between the rotary union and the upper bearing.

9. The pelletizer of claim 1 wherein the mount comprises a mounting flange and the support housing includes a fixed pipe with a larger inside diameter than the outside diameter of the rotatable pipe depending from the mounting flange.

10. The pelletizer of claim 9 further comprising a lower dust seal about a lower end of the fixed pipe between the lower bearing and the prilling head, and an upper dust seal about the rotatable pipe adjacent an opening in the mounting flange receiving the rotatable pipe.

11. The pelletizer of claim 1 wherein the support housing includes a top flange secured by a bracket in spaced relation above the mounting flange and the upper bearing is secured to the top flange.

12. The pelletizer of claim 1 wherein the drive wheel is disposed between the top flange and the mounting flange.

13. The pelletizer of claim 1 further comprising a port for introducing inert gas into an annulus between the fixed pipe and the rotatable pipe.

14. A prilling head assembly mountable on an upper end of a pelletizing vessel for throwing a petroleum resid feed material radially outwardly into an upper prilling zone in the vessel, comprising:

a rotary union including a housing, a feed inlet, a rotatable pipe depending from the housing, a flow path between the feed inlet and an upper end of the pipe disposed within the housing and a fluid tight seal between an exterior surface of the pipe and an opening in the housing;

a lower end of the rotatable pipe connected to a prilling head having a flow passage in fluid communication between an outlet from the lower end of the rotatable pipe and a plurality of orifices radially offset from an axis of the rotatable pipe;

a support housing having a mount for attachment to the pelletizing vessel and upper and lower bearings adjacent respective upper and lower ends of the support housing for rotatably receiving the rotatable pipe; and a drive wheel secured to the rotatable pipe.

15. The prilling head assembly of claim 14 further comprising a detachable coupling in the rotatable pipe between the rotary union and the upper bearing.

16. The prilling head assembly of claim 14 wherein the mount comprises a mounting flange and the support housing includes a fixed pipe depending from the mounting flange and having a larger inside diameter than the outside diameter of the rotatable pipe.

17. The prilling head assembly of claim 14 further comprising a lower dust seal about a lower end of the fixed pipe between the lower bearing and the prilling head, and an upper dust seal about the rotatable pipe adjacent an opening in the mounting flange receiving the rotatable pipe.

18. The prilling head assembly of claim 14 wherein the support housing includes a top flange secured by a bracket in spaced relation above the mounting flange wherein the upper bearing is secured to the top flange.

19. The prilling head assembly of claim 18 wherein the drive is disposed between the top flange and the mounting flange.

20. The prilling head assembly of claim 16 further comprising a port for introducing inert gas into an annulus between the fixed pipe and rotatable pipe.

21. A pelletizer for making spherical pellets from a normally solid feed material that can be made molten at an elevated temperature, comprising:

an upright pelletizing vessel having an upper prilling zone, a sphere-forming zone below the prilling zone, a cooling zone below the sphere-forming zone, and a lower cooling bath below the cooling zone;

a centrally disposed prilling head in the prilling zone rotatable along a vertical axis and having a plurality of discharge orifices for throwing the feed material radially outwardly, wherein a throw-away diameter of the prilling head is less than an inside diameter of the pelletizing vessel;

a first line for supplying the molten feed material to the prilling head;

a vertical height of the sphere-forming zone sufficient to allow material discharged from the prilling head to form substantially spherical liquid pellets;

nozzles for spraying a liquid cooling medium inwardly into the cooling zone to cool and at least partially solidify the liquid pellets to be collected in the bath;

a second line for supplying cooling medium to the nozzles and the bath to maintain a depth of the bath in the pelletizing vessel; and a third line for withdrawing a slurry of the pellets in the cooling medium.

22. The pelletizer of claim 21 further comprising an oxidation vessel for contacting a soft resid having a penetration greater than 0 and a softening point temperature below about 200° F. with air at a temperature from about 350° to about 700° F. for a period of time effective to reduce the penetration of the resid to essentially 0 and increase the softening point temperature to above 200° F. to form a hard resid suitable as feed material to the prilling head; and a process line for supplying the hard resid to the first line.

23. The pelletizer of claim 22 further comprising a solvent deasphalting unit for obtaining the soft resid as the asphaltene fraction from the solvent deasphalting of a petroleum residue.

24. The pelletizer of claim 21 comprising a heater for heating the material supplied to the prilling head.

25. The pelletizer of claim 21 wherein the discharge orifices are arrayed at a circumference of the prilling head in a plurality of vertically spaced upper and lower rows wherein the lower row or rows are disposed at a smaller radius from the axis of rotation of the prilling head than the upper row or rows.

26. The pelletizer of claim 25 wherein the prilling head has a circumference tapered from an uppermost row to a lowermost row.

27. The pelletizer of claim 25 wherein the prilling head comprises a plurality of rings of different diameter with orifices formed in an outer circumference of each ring, wherein the rings are secured to the prilling head in a descending fashion wherein each successively lower ring has a smaller diameter than the preceding ring.

28. The pelletizer of claim 21 further comprising a drive for rotating the prilling head at from about 100 to about 5000 rpm wherein the prilling head has a diameter from about 2 inches to about 5 feet, and wherein the orifices have a diameter from about $\frac{1}{32}$-inch to about 1-inch and a production capacity of from about 1 to about 1000 lbs/hr of the feed material per orifice.

29. The pelletizer of claim 21 wherein the cooling medium comprises water and further comprising a cooler for maintaining the bath in the pelletizing vessel at a temperature from about 40° to about 190° F.

30. The pelletizer of claim 29 wherein the bath comprises a non-foaming surfactant.

31. The pelletizer of claim 21 wherein the vessel comprises a conical bottom containing the bath and a discharge at a lower end of the conical bottom for feeding the slurry into the third line.

32. The pelletizer of claim 31 further comprising a liquid-solid separator for recovering the pellets from the slurry, a filter for filtering cooling medium recovered from the liquid-solid separator, a cooler for cooling the recovered cooling medium and a recirculation line for recirculating the cooled cooling medium to the second supply line.

33. The pelletizer of claim 21 further comprising a vent for withdrawing vapor near an upper end the pelletizing vessel.

34. The pelletizer of claim 21 further comprising a heater for heating an upper end of the vessel to maintain a substantially constant temperature zone adjacent the prilling head.

35. The pelletizer of claim 21 further comprising a liquid-solid separator for recovering the pellets from the slurry, wherein the liquid-solid separator comprises a vibrating screen.

36. The pelletizer of claim 35 further comprising a conveyor belt for transporting the pellets from the vibrating screen to ambient temperature storage.

37. The pelletizer of claim 21 further comprising a fourth line for introducing steam into the sphere-forming zone.

38. The pelletizer of claim 22 further comprising:

a prilling head assembly comprising a rotary union including a housing, a feed inlet, a rotatable pipe depending from the housing, a flow path between the feed inlet and an upper end of the pipe disposed within the housing and a fluid tight seal between an exterior surface of the pipe and an opening in the housing;

a lower end of the rotatable pipe connected to the prilling head, wherein the prilling head has a flow passage in fluid communication between an outlet from the lower end of the rotatable pipe and the plurality of orifices;

a support housing having a mount for attachment to the pelletizing vessel and upper and lower bearings adjacent respective upper and lower ends of the support housing for rotatably receiving the rotatable pipe; and a drive wheel secured to the rotatable pipe.

\* \* \* \* \*